No. 747,601. PATENTED DEC. 22, 1903.
D. A. GILLESPIE.
VEHICLE TONGUE ATTACHMENT.
APPLICATION FILED OCT. 24, 1903.
NO MODEL.
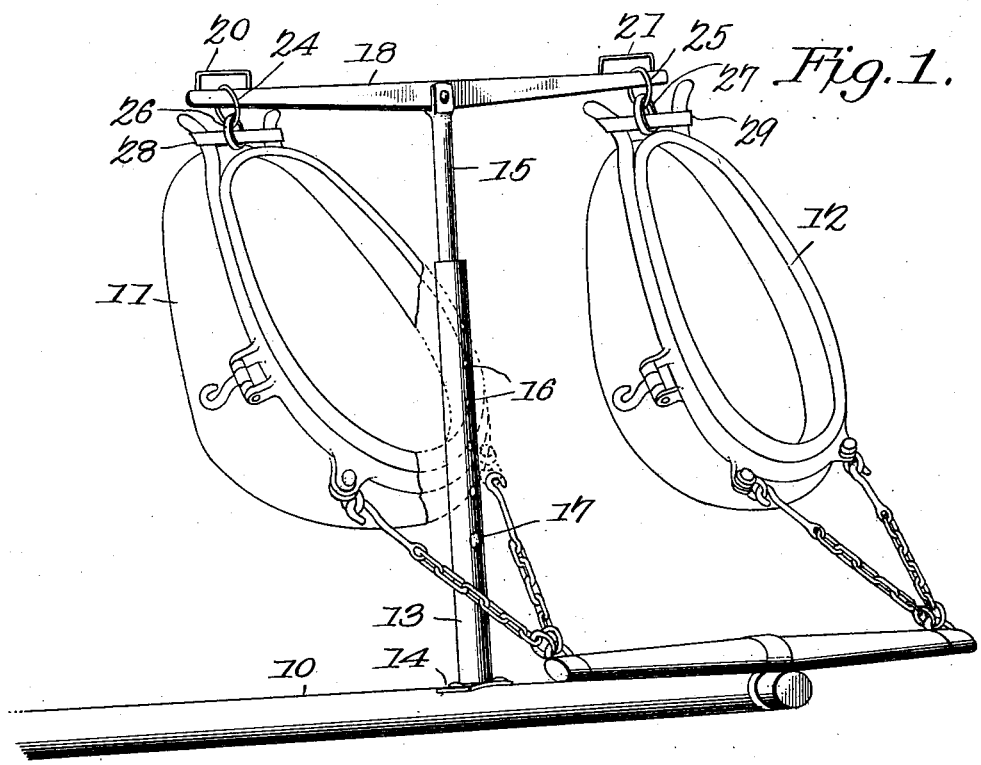
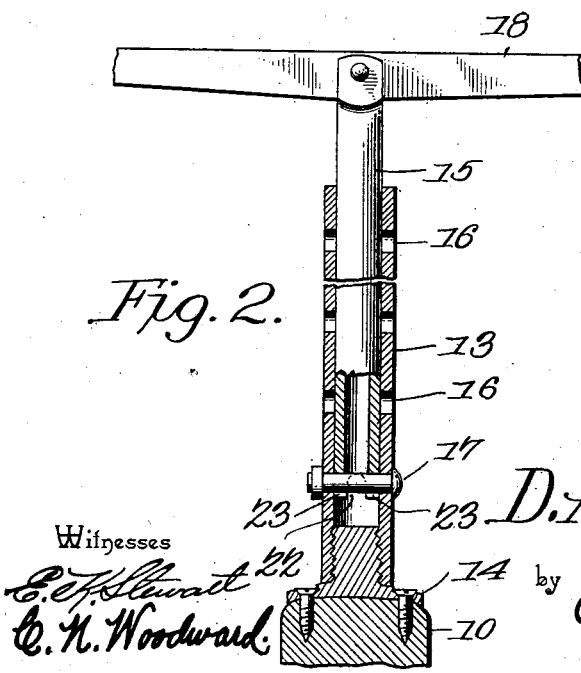
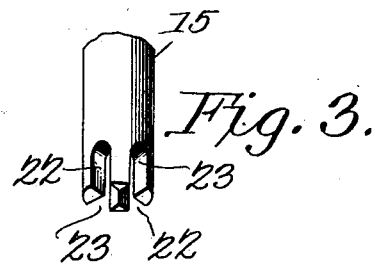
D. A. Gillespie,
Inventor.
Witnesses
by C. A. Snow & Co.
Attorneys No. 747,601. Patented December 22, 1903.

UNITED STATES PATENT OFFICE.

DAVID AUGUSTUS GILLESPIE, OF STAMFORD, TEXAS.

VEHICLE-TONGUE ATTACHMENT.

SPECIFICATION forming part of Letters Patent No. 747,601, dated December 22, 1903.

Application filed October 24, 1903. Serial No. 178,429. (No model.)

*To all whom it may concern:*

Be it known that I, DAVID AUGUSTUS GILLESPIE, a citizen of the United States, residing at Stamford, in the county of Jones and State of Texas, have invented a new and useful Vehicle-Tongue Attachment, of which the following is a specification.

This invention relates to combined riding and walking cultivators, plows, listers, and similar implements, and has for its object to produce an attachment whereby the mounting or dismounting of the operator will not affect the draft or impose additional burden or annoyance upon the draft-animals; and the invention consists in a standard for attachment to the draft-tongue and provided with lateral arms for connection to the harness at the animal's neck and serving to receive the thrust of the tongue when the burden is changed by the act of the operator in mounting or dismounting.

The invention further consists in a standard for attachment to the draft-tongue and provided with an extension member adjustable longitudinally in the standard and having lateral arms for connection to the harness at the necks of the draft-animals.

Other novel features of the invention will appear in the annexed description and be specifically pointed out in the claims following.

The improvement herein disclosed is designed for attachment to the draft-tongues of the various forms of agricultural implements—such as cultivators, listers, sulky-plows, and the like—upon which the attendant may ride while operating them or behind which he may walk, as preferred, and it is found that in implements of this general character, where the body is usually poised upon two bearing-wheels, the addition to or removal therefrom of the weight of the attendant so greatly alters the center of gravity as to seriously affect the draft and impart an additional burden upon the draft-animals. To overcome this difficulty, it has been the custom heretofore to arrange such implements so that the attendant is required to ride continuously or walk continuously to prevent this additional burden.

To provide means whereby the attendant may walk or ride at pleasure without affecting the draft is the object of the present invention, and in the drawings illustrative of the invention, in which corresponding parts are denoted by like designating characters, Figure 1 is a perspective view of a portion of a draft-tongue and the hames and collars of a team of draft-animals with the improvement applied. Fig. 2 is a sectional elevation of the attachment enlarged. Fig. 3 is a perspective detail of a portion of the adjustable member.

A conventional form of draft-tongue is represented at 10 and a pair of horse-collars and hames at 11 12, positioned relative to the tongue as in use upon the draft-animals. The body of the implement to which the tongue is attached is not shown; neither are the draft-animals shown, as they form no part of the present invention, which is applicable to any form of tongue or harness connections.

The improved device consists of a standard 13, attached, as by a foot portion 14, to the tongue 10. The standard member is preferably tubular and is provided with an extension member 15, also preferably tubular and slidable longitudinally within the standard. The standard 13 is provided with a plurality of transverse apertures 16, through which a stop-pin 17 is designed to be passed to support the member 15, and by adjusting the pin in the holes 16 it is obvious the member 15 may be set at any point desired. The upper end of the member 15 is provided at its ends with slidable rings 24 25, limited in their movement by confining-loops 20 21, these rings for detachable connection, as by straps 26 27, to the fastening-straps 28 29 of the hames or to some other portion of the collars or hames. By this simple means a flexible connection is secured between the collars and hames and the arm 18, as shown.

The lower end of the member 15 is provided with oppositely-disposed transverse recesses 22 23, so that when the member 15 is set upon the pin 17 by the recess 23 the arm 18 will be held transversely of the tongue 10 or in operative position relative to the hames or collars, and when set upon the recess 22 the arms will be held longitudinally of the tongue or out of operative position.

When the team is unhitched, the member 15 will be set with the arm 18 longitudinally of the tongue, so that the attachment will not interfere with the removal of the team, and when the team is again hitched up the ends of the arms can be very quickly set in position and strapped fast to the hames or collars and without adding materially to the work of the driver. Then when the driver mounts the seat of the implement the sudden change of the center of gravity caused thereby, which would otherwise throw the forward end of the tongue upward, is absorbed by the attachment and transferred to the collars and hames and distributed over the necks of both of the draft-animals and does not materially affect the "draft." The attachment is thus laterally movable relative to the hames and collars, so that the usual lateral vibrations of the tongue will not be communicated to the draft-animals. By this simple arrangement the operator can mount and dismount as often as required without producing any deleterious effect upon the draft or increasing the burden upon the draft-animals or contribute to their discomfort in any manner.

In the foregoing description is shown the approved form of the invention, but is not necessarily limited thereto, as the parts may be modified and altered in minor particulars without departing from the principle of the invention or sacrificing any of its advantages, and I reserve the right to make such alterations and modifications as may fall within the scope of the claims.

Having thus described the invention, what I claim is—

1. An attachment for vehicles consisting of a standard for attachment to the draft-tongue and provided with lateral arms for connection to the harness of the draft-animals, substantially as specified.

2. An attachment for vehicles consisting of a standard for attachment to the draft-tongue and provided with lateral arms for connection to the harness above the necks of the draft-animals, substantially as specified.

3. An attachment for vehicles consisting of a standard for attachment to the draft-tongue and provided with lateral arms, and flexible connections between the harness of the draft-animals and said arms and slidable longitudinally thereon, substantially as specified.

4. An attachment for vehicles consisting of a standard for attachment to the draft-tongue and provided with lateral arms having rings slidable longitudinally thereon, and flexible connections between said rings and the harness of the draft-animals, substantially as specified.

5. An attachment for vehicles consisting of a standard for attachment to the draft-tongue and provided with lateral arms having rings slidable longitudinally thereon, keeper-loops upon said arms and embracing said rings, and flexible connections for attachment to the harness of the draft-animals, substantially as specified.

6. An attachment for vehicles consisting of a standard for connection to the draft-tongue and provided with lateral arms for connection to the harness of the draft-animals, and means for adjusting said standard vertically, substantially as specified.

7. An attachment for vehicles consisting of a standard for connection to the draft-tongue, and an extension adjustable longitudinally of said standard and provided with lateral arms for connection to the harness of the draft-animals, substantially as specified.

8. An attachment for vehicles consisting of a tubular standard for connection to the draft-tongue, and an extension slidable in said standard and adjustable longitudinally therein and provided with lateral arms for connection to the harness of the draft-animals, substantially as specified.

9. An attachment for vehicles consisting of a tubular standard for connection to the draft-tongue and provided with a plurality of spaced transverse apertures, a stop-pin for alternate engagement with said apertures, an extension member slidable in said standard and having lateral arms for connection with the harness of the draft-animals, said extension having oppositely-disposed transverse recesses for alternate engagement with said stop-pin, substantially as specified.

In testimony that I claim the foregoing as my own I have hereto affixed my signature in the presence of two witnesses.

DAVID AUGUSTUS GILLESPIE.

Witnesses:
J. A. WARD,
W. A. MERR.